United States Patent

[11] 3,562,481

| [72] | Inventor | Laurice J. West<br>5 Jadewood Drive, Levittown, Pa. 19056 |
|---|---|---|
| [21] | Appl. No. | 820,086 |
| [22] | Filed | Apr. 29, 1969 |
| [45] | Patented | Feb. 9, 1971 |

[54] SUBSTRATE SOLDERING SYSTEM
4 Claims, 2 Drawing Figs.

[52] U.S. Cl. .................................................. 219/85, 29/629
[51] Int. Cl. .............................................. B23k 1/02
[50] Field of Search ........................................ 219/85, 78, 86, 111; 29/626

[56] References Cited
UNITED STATES PATENTS

| 2,926,231 | 2/1960 | McDowell | 219/85 |
| 3,289,046 | 11/1966 | Carr | 219/85 |
| 3,317,703 | 5/1967 | Gilbert | 219/111 |
| 3,436,818 | 4/1969 | Merrin et al. | 29/626 |
| 3,465,116 | 9/1969 | Dix | 219/85 |

Primary Examiner—J. V. Truhe
Assistant Examiner—L. A. Schutzman
Attorney—Paul & Paul ABSTRACT: An apparatus and process are disclosed for simultaneously soldering a plurality of junctions on a micro printed circuit board, comprising a first time-controlled voltage generator, the output of which is applied to a heating element during a preheat period, a second time-controlled voltage generator to maintain the temperature of the solder at a specified temperature, and a time-regulated cooling unit which cools the soldered circuit board after the soldering period, each operating in sequence as controlled by switching circuitry.

INVENTOR.
Laurice J. West
BY
Paul & Paul
ATTORNEYS.

3,562,481

SUBSTRATE SOLDERING SYSTEM

BACKGROUND OF THE INVENTION

1. FIELD OF THE INVENTION

This invention lies in the field of soldering systems, and, more particularly, systems for controlled soldering of microprinted circuit boards.

2. DESCRIPTION OF THE PRIOR ART

With the advent of modern electronics and micro circuitry, new soldering techniques have necessarily been devised. One of the first of these, and now an old technique, was that of dip-soldering printed circuit boards, to which the individual circuit element has been attached. This technique is in most instances an art, there being little if any control over the temperature at which the soldering is accomplished, or the time duration of the soldering. Presently, equipment has been devised and is available in the art for applying solder and heat to microcircuit boards on which microelements have been placed. However, there remains a need for accurately controlling the temperature of the solder at the joints being soldered, the time duration of the soldering, and the manner of cooling the soldered circuit immediately after the soldering has been accomplished. Apparatus is available with which the junctions on micro circuit boards can be raised to any temperature for soldering, and apparatus is available for the cooling of same. However, there is nothing available in the art at present by which the soldering procedure can be programmed and controlled, which is simple, easy to operate, and inexpensive.

SUMMARY OF THE INVENTION

The primary object of this invention is to provide a method and apparatus for programming and controlling the soldering of microcircuits.

Another object of this invention is to provide apparatus which is simple in design and operation, capable of controlling the soldering of microcircuits at different temperatures and for different controlled time sequences.

It is a further object of this invention to provide an economical soldering system which does not incorporate feedback controls.

Accordingly, this invention provides a novel and effective system for controlled soldering of microcircuitry which comprises a control unit, a heating element controlled by said control unit on which the microcircuit is placed for soldering, and a cooling unit activated and controlled by the control unit, which cools the soldered circuit upon termination of the soldering. The control unit is comprised of voltage sources, a preheat timer which times and controls a first voltage applied to the heating element in order to raise same quickly to a high temperature, a solder timer which controls and times a second voltage applied to the heating element in order to maintain same at a programmed temperature for a specified period of time, and a cooler timer which activates a cooling unit. The operation of these three timers is sequenced by relays which switch at the expiration of their respective timing periods, and which are coupled such that the heating element is programmed through a sequence of preheat, followed immediately by soldering, and followed in turn immediately by a cooling period.

DESCRIPTION OF THE PREFERRED EMBODIMENT

Figure 1:
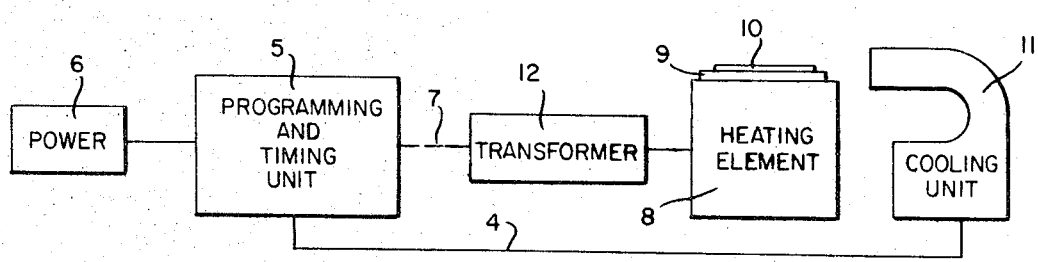
FIG. 1 shows a block diagram of the substrate soldering system, indicating the components thereof.

Referring now to the drawings, FIG. 1 shows a control unit 5 which is powered from a conventional power source 6. When programmed and started, unit 5 will produce voltage outputs coupled through line 7 and applied to heating element 8, which voltages will control the temperature of said element. A transformer 12 is generally placed prior to heating element 8 to provide the proper voltage. Heating element 8 may be any commercially available element designed to accommodate the size of the micro printed circuit board being soldered, and which can generate the temperature necessary for the soldering application. Such heating element unit is generally designed to accommodate a dish 9, in which is placed the micro printed circuit board 10, said dish conducting heat uniformly in a manner so as to hold the junctions of circuit board 10 at the desired temperature. In the application of this apparatus and method, the micro circuit board has had solder and flux applied, such that only the operations of soldering and cooling are involved in this invention. Also indicated in FIG. 1 is a blower 11, being a preferred embodiment of a cooling unit utilized to cool circuit board 10 upon termination of the soldering sequence. Blower 11 is a standard commercially available blowing unit designed specifically for the purpose of cooling heated circuit junctions.

Figure 2:
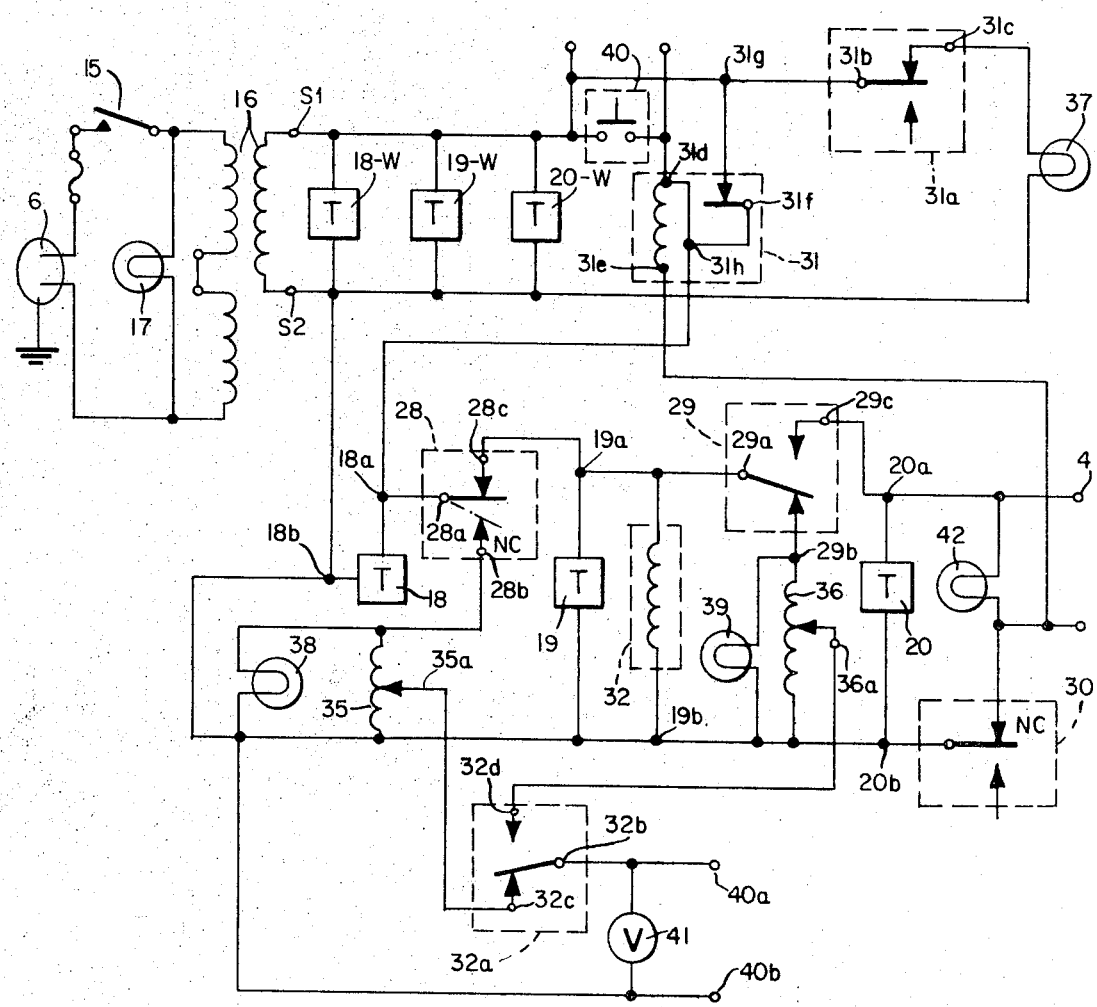
FIG. 2 shows a schematic diagram of the control unit.

Referring now to FIG. 2, the detailed circuitry of the control unit is set forth. The power source 6 is coupled through a standard switch 15 to the primary of a voltage regulating transformer 16. A neon bulb 17 across said primary indicates when power is available to the unit. Directly across the secondary terminals of said transformer 16, indicated as S-1 and S-2, are placed the windings of three timers, 18-W, 19-W, and 20-W. Timer 18 represents the preheat timer, timer 19 represents the solder timer, and timer 20 represents the cooler timer. The timers used in this embodiment are standard industrial timers, having a timing action referenced to the frequency of the line voltage which is held essentially constant at 60 cycles per second. Such timers have a dial face on which the operator can set the desired time for each respective operation.

The preheat timer 18 is energized when a voltage is placed across terminals 18a and 18b. Similarly, solder timer 19 is energized when a voltage is placed across terminals 19a and 19b, and the coolers cooler timer is energized when a voltage is placed across terminals 20a and 20b. Each of the timers in turn operates a switch, in a manner to be described below. Preheat timer 18 operates switch 28; solder timer 19 operates switch 29 and cooler timer 20 operates switch 30. The operation of relays 31 and 32, as well as the remaining elements of the circuit, are explained in the ensuing discussion.

The method which the system is designed to carry out embodies a preheat stage, a soldering stage, and a cooling stage. A typical desired soldering temperature is 210° C. In order to bring the soldering element to this temperature quickly a preheat stage is utilized, during which a voltage is applied to the heating element which would raise it to a temperature well in excess of 210° C, thus permitting more rapid increase in temperature. At the time that the preheat voltage has raised the heating element to 210° C, the system switches to the soldering stage, during which a constant voltage is applied which maintains the temperature of the heating element constant at the desired temperature. The soldering stage lasts for the time period during which soldering is to be performed, at the close of which the system goes into the cooling stage, in order to quickly cool the circuit so as to obtain good solder joints, and so that it may be removed and another circuit placed into the system for soldering.

Accordingly, the operation of the apparatus is as follows:

The operator sets the preheat timer 18 and the preheat variac 35 for the correct time and voltage respectively in order to raise the temperature of the solder to the desired level. Similarly, the operator sets solder timer 19 and solder variac 36 for the proper time and voltage respectively. Preheat variac 35 and solder variac 36 will deliver a range of voltages sufficient to vary heating element 8 through any range of temperatures desired. Finally, for the cooling stage, the operator sets cooler timer 20 according to the desired period of cooling.

To initiate the system operation, on-off switch 15 is placed in the closed position, at which time bulb 17 lights, indicating that the system has power. The input voltage is transformed to transformer 16 secondary terminals S-1 and S-2, which voltage is transmitted directly to ready bulb 37, which indicates that the system is ready for operation. It is to be noted that terminal S-1 is coupled to ready bulb 37 through switch 31a of relay 31. Such switch is normally in the position shown, providing direct coupling between terminals 31b and 31c. To start operation, the operator depresses start pushbutton 40, thereby coupling terminal S-1 to terminal 31d of relay 31. It is to be noted that terminal 31e or of relay 31 is connected through switch 30 to terminal S-2, such that the full secondary voltage is placed across relay 31. With relay 31 energized, switch 31f, which is normally open, closes, thereby connecting points 31g and 31h. This connection provides a parallel path energizing relay 31, which keeps said relay energized after switch 40 has been reopened.

The energization of relay 31 couples terminal S-1 through to preheat timer energization terminal 18a, thereby initiating said timer. While timer 18 is energized, switch 28, normally closed as shown, provides coupling between terminals 28a and 28b, thereby energizing preheat variac 35 and the preheat bulb 38. The output of variac 35 is taken through terminal 35a and coupled through switch 32a which is controlled by relay 32. When relay 32 is unenergized, as it is during the preheat stage, switch 32a is in a normally closed position, coupling terminals 32b and 32c. Thus, during the preheat stage, a voltage appears across output terminals 40, 40a and 40b, as well as across voltmeter 41 which presents a readout display of the voltage output.

The soldering stage is initiated when preheat timer 18 reaches the end of its timing period, at which point switch 28 changes to provide coupling between points 28a and 28c. This deenergizes the preheat variac, and energizes solder timer 19, relay 32, an through switch 29, solder variac 36 and the solder bulb 39. Prior to the expiration of the timer period of solder timer 19, switch 29 is in the normally closed position shown, and provides coupling between terminals 29a and 29b, thereby energizing solder variac 36. Further, the energization of relay 32 causes switch 32a to provide a coupling between terminals 32b and 32d, thus connecting the output of solder variac 36 taken at terminal 36a, through the output terminals 40a and 40b. Thus, during the solder stage, a voltage determined by the setting of solder variac 36 is applied to heating element 8. Such stage lasts for a duration as determined by the setting of solder timer 19.

The last stage of the process, the cooling stage, is initiated when solder timer 19 stops, thereby switching switch 29 to couple terminals 29a and 29c. The solder variac 36 is thereby deenergized and blower timer 20 is thereby energized. Blower 11 and the blower bulb 42 are also energized, and remain so during the duration of the blower timer period. At the end of said period, switch 30 changes from its normally closed position to an open position, thereby deenergizing blower 11 and blower bulb 42. Additionally, the opening of switch 30 acts to deenergize relay 31, which returns the entire system to its original deenergized state. The timer switches 28,29 and 30 all return to their normal conditions, as do switches 31a and 32a, leaving only the power bulb 17, the ready bulb 37, and timer windings 18-W, 19-W and 20-W energized.

Although this invention has been described with specific reference to a preferred embodiment thereof, modification and changes can be made within the spirit and scope of the invention. Although the cooler unit in the overall system has been described as a blower, any applicable type of cooling system could be utilized. Further, it is appreciated that minor changes in coupling and switching could be made without changing substantially the performance of the apparatus.

I claim:

1. Control apparatus for controlling of a soldering system consisting of a heating element and cooling unit, comprising:
  a. power supply means for supplying a source of electrical power, characterized by a power-holding switch;
  b. first variable voltage means for providing a first voltage to energize said heating element for a first time period and to quickly elevate the temperature of same;
  c. first timing means for determining said first time period, characterized by a first switch connected to said source, which connects said source to the input of said first variable voltage means until the end of said first time period and to a first normally open output terminal thereafter until reset;
  d. second variable voltage means connected to said first normally open output terminal of said first switch, for energizing said heating element for a second time period to maintain same at a chosen soldering temperature;
  e. second timing means for determining said second time period, characterized by a second switch which connects said first normally open terminal of said first switch to the input of said second variable voltage means until the end of said second time period, and to a second normally open output terminal thereafter until reset;
  f. heating element switching means for connecting the output of said first variable voltage means to a said heating element during said first time period and the output of said second variable voltage means to said heating element during said second time period; and
  g. third timing means connected to said second normally open terminal for determining a third time period, characterized by a third switch which connects said power source means to said cooling unit during said third time period.

2. Apparatus according to claim 1 wherein said holding switch comprises a winding and is energized in a hold position by current flow through said winding, and said third switch provides a current path through said winding during said first, second and third time periods, and provides an open circuit to said winding after said third time period, thereby releasing said holding switch and deactivating said power source.

3. Apparatus as described in claim 1 wherein said first, second and third timing means each comprise timers which begin to time a time period when connected to said source, each said timer causing its switch to connect its input terminal to a normally open output terminal upon the termination of its time period.

4. A method of control of a soldering system consisting of a heating element and a cooling unit for sequentially soldering and cooling a plurality of junctions on a printed circuit board, comprising:
  a. connecting a voltage source to a first variable voltage generator, and connecting the output of said first variable voltage generator to said heating element to quickly elevate the temperature of same;
  b. timing a first time period, during which a first voltage is derived from said first variable voltage generator, which first voltage energizes said heating element during said first time period;
  c. disconnecting said first variable voltage generator from said voltage source and connecting said voltage source to a second variable voltage generator and connecting the output of said second variable voltage generator to said heating element to maintain same at a chosen soldering temperature;
  d. timing a second time period, during which a second voltage is derived from said second variable voltage generator which second voltage energizes said heating element during said second time period;
  e. disconnecting said second variable voltage generator from said voltage source and connecting a third voltage generator to said voltage source and connecting the output of said third voltage generator to said cooling unit to cool the junctions on said printed circuit board;
  f. timing a third time period during which said third voltage generator derives a third voltage from said voltage source which third voltage energizes said cooling unit during said third time period; and
  g. disconnecting said third voltage generator from said voltage source after said third time period.